United States Patent [19]

Fedora et al.

[11] Patent Number: 5,154,016
[45] Date of Patent: Oct. 13, 1992

[54] REMOTE CONTROL ANGLING DEVICES

[75] Inventors: Gary W. Fedora, Georgetown, Canada; Douglas Sehl, Crystal Beach, Fla.

[73] Assignee: Lazy Fisherman Incorporated

[21] Appl. No.: 637,236

[22] Filed: Jan. 3, 1991

[51] Int. Cl.$^5$ .............................. A01K 97/00
[52] U.S. Cl. .................... 43/26.1; 446/154; 43/4
[58] Field of Search ............ 43/26.1, 4, 4.5, 27.4; 446/154

[56] References Cited

U.S. PATENT DOCUMENTS

| | | |
|---|---|---|
| 2,951,307 | 9/1960 | Joy . |
| 3,710,500 | 1/1973 | Pena . |
| 3,922,808 | 12/1975 | Reith et al. . |
| 4,161,077 | 7/1979 | Ciaccio et al. . |
| 4,253,165 | 2/1981 | Christiansen ........................ 43/4 |
| 4,339,811 | 7/1982 | Bednarz et al. .................. 43/26.1 |
| 4,339,888 | 7/1982 | Sheng-Jung ...................... 43/26.1 |
| 4,376,350 | 3/1983 | Bednarz et al. .................. 43/26.1 |
| 4,448,145 | 5/1984 | Hervieu ............................... 43/4 |
| 4,757,633 | 7/1988 | Van Cleve . |
| 4,793,088 | 12/1988 | Fortuna . |
| 4,856,222 | 8/1989 | Hannam . |
| 4,890,409 | 1/1990 | Morgan et al. . |

*Primary Examiner*—Richard K. Seidel
*Assistant Examiner*—James Miner
*Attorney, Agent, or Firm*—Patrick J. Hofbauer

[57] ABSTRACT

An improved angling device operable under physically autonomous, remote control by an operator, comprising an unmanned flotation platform including remotely operable propulsion and directional controls for selectively positioning the flotation platform under the remote, physically autonomous control of the operator, at a desired location on a surface of a body of water associated with fish habitat; and downward-looking sonar supported in buoyant relation on the platform and operable to provide intelligible feedback to the operator, based on sonar-sensed signals relating to that fish habitat. The combination of the improved angling device can include a terminal tackle depth control supported in buoyant relation on the platform, for selective adjustable positioning of the terminal tackle at desired depths under the remote, physically autonomous control of the operator.

22 Claims, 5 Drawing Sheets

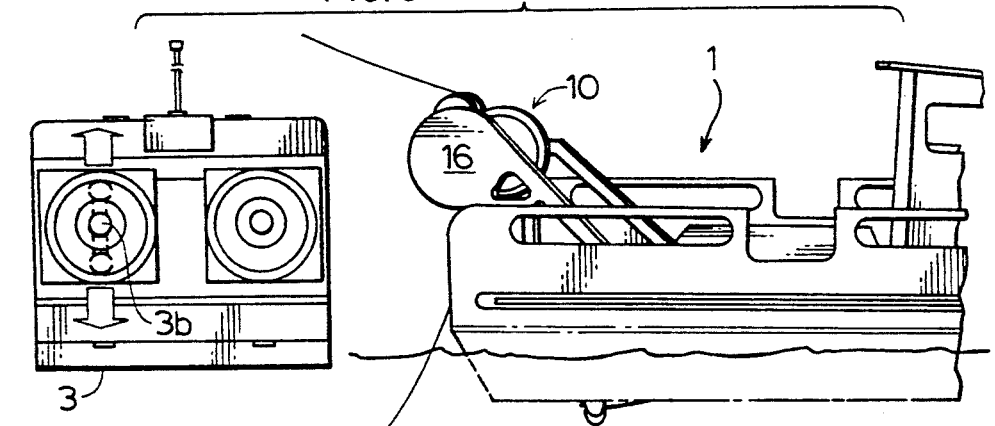
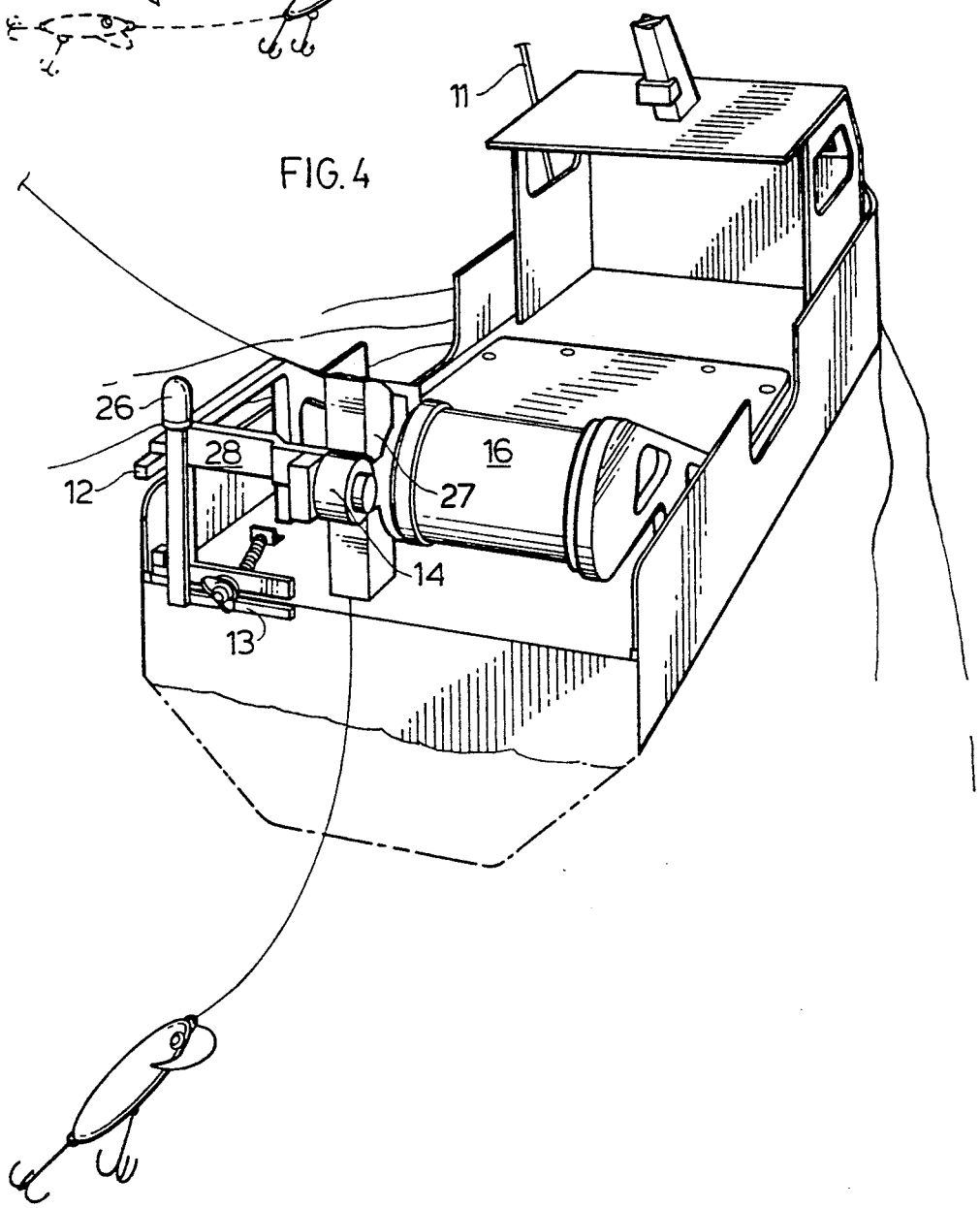

REMOTE CONTROL ANGLING DEVICES

FIELD OF THE INVENTION

This invention relates to remote control angling devices and in particular to improvements therein which are adapted to improve the selective remotely controlled positioning of angling terminal tackle.

BACKGROUND OF THE INVENTION

Positioning of terminal tackle is critical to the success of any angling activity, regardless of what form that activity might take.

For the shore-bound angler, for example, the limits on the traditionally unaided, selective positioning of terminal tackle is a function of casting skill, (practice and inherent physical coordination), and the ballistic limitations of the combination of the fishing rod and the strength of the fisherman's arm. Taken together, all these influences constrain an angler's fishing activity to that small area of water that extends out a short distance from the shore line in the angler's immediate proximity.

Even angler's privileged enough to have the use of a boat, are often faced with significant limitations on the scope of their angling opportunity. These limitations arise due to such things as obstructions which do not admit the boat to desirable fish habitats, or habitat where the draft of the vessel exceeds the depth of water associated with that particular habitat.

All angler's, be they shore-bound or aboard a fishing vessel of any size, can be subject to crowding by adjacent anglers, and to the limitations that such crowding imposes on the arcuate extent of each anglers fishing field.

The handicapped, ill or convalescing angler is faced with a number of obstacles to the enjoyment of the sport. Casting itself can be difficult or even impossible. Access to shoreline fishing opportunities can be highly limited, and even those that are available are likely to be subject to a great deal of fishing pressure, as well as often being less than ideal fish habitats in the first place. Access to boats is also somewhat limited, even for those who in spite of their handicaps or medical conditions, feel secure enough to venture out in a suitably accommodating vessel.

In response to these issues, there have been developed a variety of remote controlled fishing vessels. Illustrative devices are described in U.S. Pat. No. 3,710,500—Pena; No. 4,161,077—Ciaccio; No. 4,339,888—Sheng-Jung; No. 4,856,222—Hannam.

The first of the above-listed patents relates to a radio controlled, self-propelled fishing float. The float is adapted to release a pre-determined and non-adjustable length of fishing line connected to selected terminal tackle, after a predetermined period of time following the release of the float by the angler.

U.S. Pat. No. 4,161,077 relates simply to a radio controlled model boat with means for releasably trolling a predetermined and non-adjustable length of fishing line secured to selected terminal tackle.

U.S. Pat. No. 4,339,888 relates to a radio controlled model boat which is adapted to tow and selectively release a fishing float. The float has a motorized reel for deploying and retrieving the terminal tackle. In operation, a predetermined amount of line is deployed from the float after a preset time interval. The amount of line so deployed is not adjustable. When a fish strikes the terminal tackle, a motorized retrieval system is activated and the line is retrieved by the float, which is then retrieved by the angler.

The last of the abovementioned U.S. Pat. No. 4,856,222, relates to a remote controlled model boat having a particular type of fishing line release.

Note that the two "float" type devices described above are arranged in series between the angler and the terminal tackle, with the result that an angler is unlikely to feel much of the fight that is associated with the sport. Moreover, none of the above devices in any way facilitate any controllable vertical positioning of the terminal tackle, or provide for the feedback of any intelligence related to the likelihood of successful angling in relation to any given location of the remote controlled boat/float. In short none of the above devices goes very far towards facilitating the intended purpose of providing a remotely controlled means for critically positioning terminal tackle in a deliberate and informed manner, responsive to the perceived fishing opportunity.

Fishing is not a two-dimensional challenge and the ability to merely controllably position the boat randomly over the surface of a body of water will do little to enhance the angling experience. Furthermore, the ability to selectively position the terminal tackle is useful only in conjunction with current intelligence relating to the presence of fish or the nature of the fish-habitat below the waters surface. The remote control solutions that have been advanced to date are inadequate in at least these abovementioned respects. Their respective short-comings undoubtedly have played a major, if not singular role in preventing any such solutions from gaining commercial acceptance. Certainly those short comings are the very antithesis of the intended purpose of these prior devices, i.e. facilitating the active angling experience. Accordingly there remains an ongoing, and substantial need for improved remote controlled fishing devices.

SUMMARY OF THE INVENTION

In accordance with one aspect of the present invention, there is provided a device operable under physically autonomous, remote control by an operator, comprising:

an unmanned, miniature flotation platform including remotely operable positioning (e.g. propulsion and directional) control means for selectively positioning said flotation platform under the remote, physically autonomous control of said operator, at a desired location on a surface of a body of water; and, downward-looking sonar means supported in buoyant relation on said platform and operable to provide intelligible feedback based on sonar-sensed signals, to said operator.

Amongst the advantages that can accrue through such a use of a remote sensing sonar is the hydrographic mapping of difficult to reach bodies of water. The unmanned and miniaturized size of the device also affords potential savings in fuel and related environmental costs.

More specifically, however, there is provided in accordance with the present invention an improved angling device operable under physically autonomous, remote control by an operator, comprising:

an unmanned flotation platform including remotely operable propulsion and directional control means for selectively positioning said flotation platform under the remote, physically autonomous control of said operator, at a desired location on a surface of a body of water associated with fish habitat; and, downward-looking sonar means supported in buoyant relation on said platform and operable to provide intelligible feedback to said operator, based on sonar-sensed signals relating to said fish habitat.

The related sonar apparatus typically includes a transducer arranged in downward sensing relation. This transducer is operatively connected to interpretive circuitry, known in the sonar and especially fishing sonar arts, for converting sonar-sensed signals into intelligence having angling relevance.

That intelligence is then preferably conveyed to the operator in one perceptible format or another. Preferably, this is achieved through the use of a visual display comprising a standard extending aerially above the platform, in full view of the operator. In accordance with one embodiment of the present invention the platform is configured as a miniature boat hull and the standard is arrayed on the superstructure of the boat-shaped platform, so as to resemble a boat mast. A plurality of lights arranged on the mast can then be utilized to communicate the intelligence to the operator.

In any case the intelligence having angling relevance will typically comprise a selected one of the group consisting of:

the depth of the water beneath the platform; the depths at which fishes ar located beneath the platform;

the presence of fish beneath the platform; or any combination of any of the above.

Any one or the other of the above are useful to the operator for locating the platform over desirable fish habitats, to thereby increase the chances of successfully catching fish.

The advantages of such sonar intelligence are best realized in conjunction with means for positioning the terminal tackle at a depth where it will increase the probability of a strike. In accordance with this aspect of the invention therefore, there is provided an angling device in combination with a flotation platform and supported sonar device, which further includes depth control means for selectively and adjustably positioning terminal tackle. The depth control means is supported in buoyant relation on said platform, for selectively adjustable positioning of the terminal tackle, at desired depths under remote, physically autonomous control by said operator.

Radio remote control is the preferred form of control over the positioning and depth control means. This can be accomplished through the use of known control devices such as a conventional, at least two channel radio control transmitter operable on one said channel to control said position and on the other said channel to raise and lower said terminal tackle.

The present invention also relates to the use of a compact terminal tackle depth control device, and in particular to the use of that device in the combinations described hereinabove.

A particular advantage accruing through the use of the above combination is that it affords a teacher the chance to interactively participate with a student who is learning to fish. This is especially advantageous in teaching children, (as for example might be done by having a parent position the terminal tackle and leaving the child to actually hook and play the fish).

The above described depth control device need not necessarily be utilized in conjunction with sonar, as in the above combination. It can be used on the platform, whether it is equipped with sonar or not. Moreover the platform need not even be physically autonomous. It could be a planar board for example. This arrangement helps to leave the gunnels of a boat free. The device itself is a very simple to load and use downrigger even if it is used on the gunnels of a full sized boat, if desired.

INTRODUCTION TO THE DRAWINGS

In the course of the following detailed description of certain aspects of the present invention, reference will be made to the appended drawings in which:

FIG. 1 illustrates an operator utilizing a remote control radio transmitter device to physically autonomously control an angling device in accordance with the present invention;

FIG. 2 of the drawings depicts lateral plan views of the angling device in accordance with the present invention together with a remote control device;

FIG. 3 depicts adjacent views of another aspect of the remote control device together with an aft section of the angling device in accordance with the present invention, detailing a remotely controllable downrigger;

FIG. 4 is a perspective end view of the angling device according to the present invention, further detailing the downrigger device;

Figure 6:
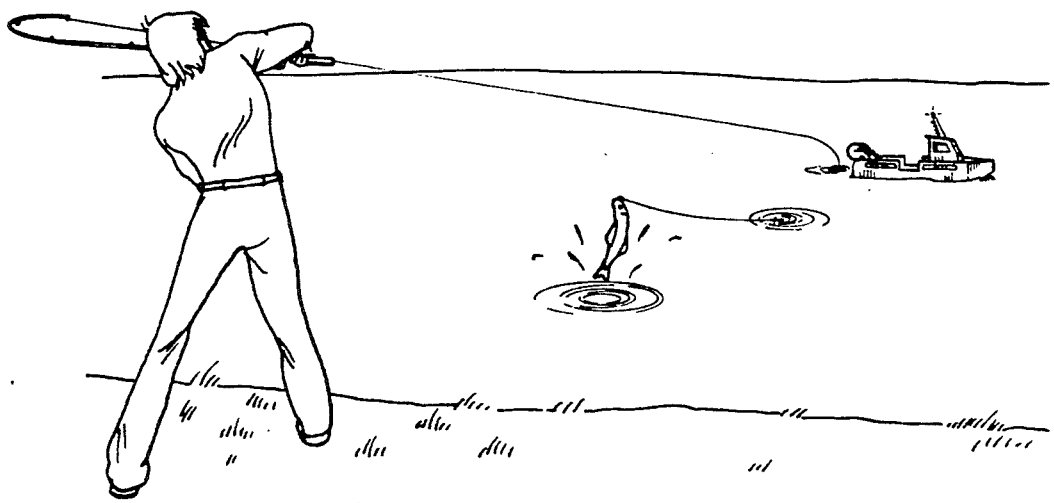
Figure 7:
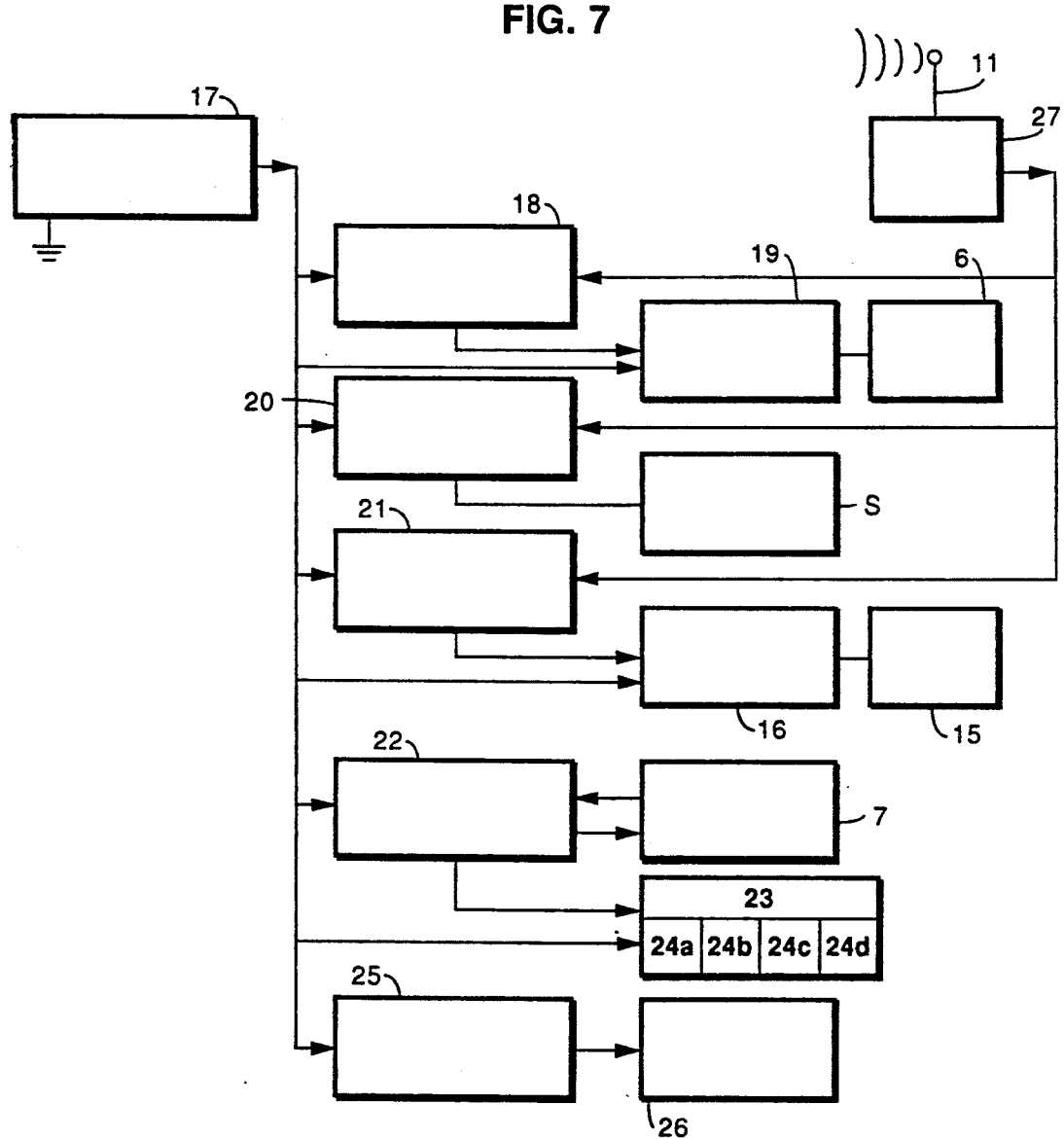
Figure 8:
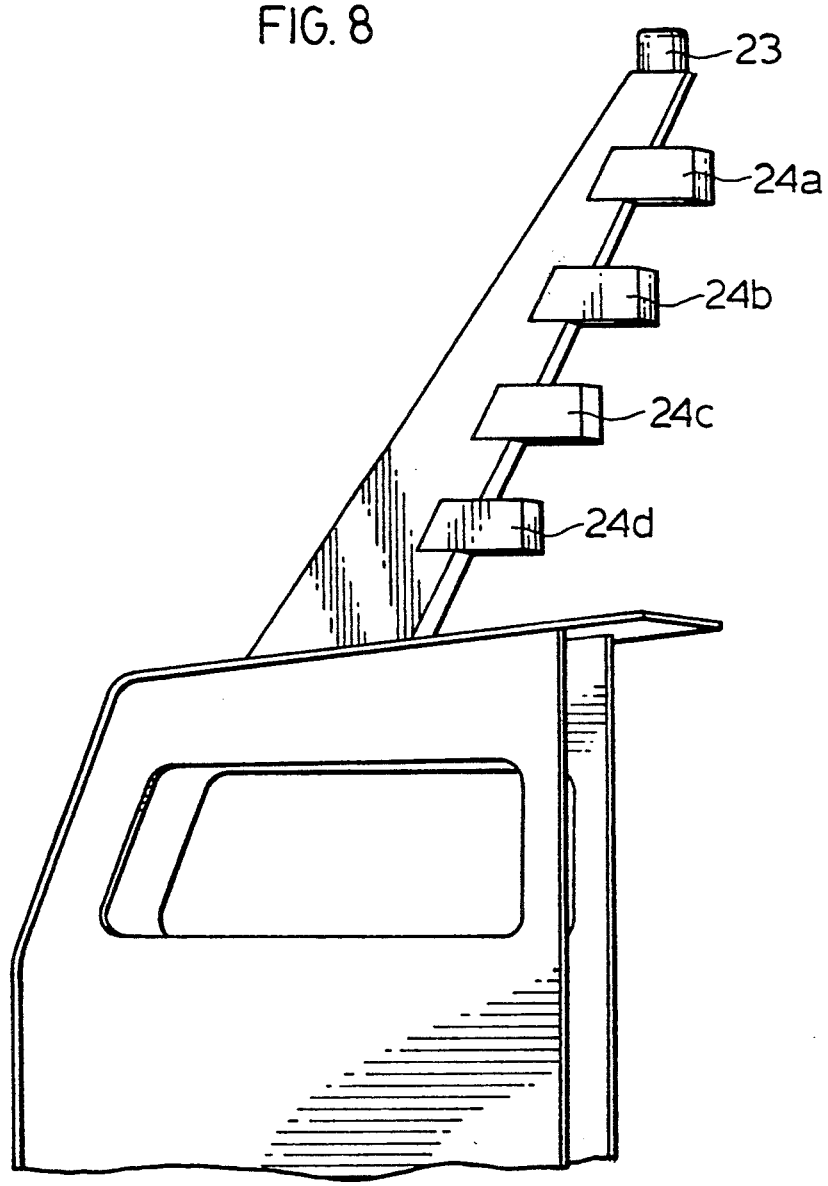

FIG. 6 of the drawings depicts an operator releasing the fishing line from the rear of the angling device in accordance with the present invention;

FIG. 7 depicts a conceptual schematic view of the on board operating components of the angling device in accordance with the present invention; and, FIG. 8 of the drawings depicts a radio mast standard mounted on a cuddy cabin roof of the angling device in accordance with the present invention, whereon visible indicia for determining the presence of fish, and the depth of either the bottom or the fish beneath the present angling device.

DETAILED DESCRIPTION OF THE INVENTION

Referring now to the drawings in general, there is provided an angling device 1 operable under the physically autonomous remote control of an operator 2 utilizing a radio remote control transmitter 3, for this purpose. Angling device 1 comprises a floatation platform 4 shaped in the style of a fishing vessel. The angling device includes remotely operable propulsion and directional control means, including rudder 5 and propeller 6. Also mounted on platform 4 is a transducer 7, which forms part of a downwardly looking sonar means. This sonar means further includes interpretive means 22 and a display means for conveying information received by the transducer 7, and interpreted by interpretive means 22, to operator 2. In the illustrated embodiment, the display means comprises generally aerially extending radio mast standard 8 which is illustrated in greater detail in FIG. 8 of the drawings. Referring to FIG. 8 in particular, there is shown an uppermost light 23 which is selectively illuminated under the control of interpretive means 22, in response to sonar return signals indicative of the presence of fish within the volume of water defined by the cone angle of the transducer. Lights 24a through 24d are also selectively illuminated by interpretive means 22 in a predetermined manner to indicate a switchably selected one of either fish or bottom depths. The design and operation of the sonar device consistent with these purposes is well known in the art.

Angling device 1 further includes depth control means 10 adapted to selectively position terminal tackle 9 below and behind angling device 1. The downrigger device comprises a downrigger motor 16, operably controlled with respect to direction and speed through downrigger direction/speed controller 21, under the physically autonomous control of operator 2. Depth control means 10 includes a friction wheel 15 connected in driven relation to downrigger motor 16. A conventional fishing line is passed through line channel 27 (see FIG. 2) and between a nip formed between friction wheel 15, and a freewheeling pulley wheel 14. Pulley wheel 14 and line channel 27 are mounted on hinged gate 28. The hinged gate 28 opens outwardly and downwardly from the rear of the floatation platform 4, on hinges 12. Gate 28 is normally, adjustably, biased to bring pulley wheel 14 into contact with friction wheel 15. The adjustable bias is achieved by way of a butterfly nut on a bolt arranged in series with a tensioned spring that is secured at its far end to platform 4. The tension is preferably adjusted such that the fishing line is released from the depth control means 10 either in response to a fish taking terminal tackle 9 or in response to an anglers sharp tug on the other end of the fishing line. In any case, the depth control means preferably includes a micro switch arranged intermediate the gate and the floating platform, and operable upon release of the line from depth control means 4 to illuminate line release light 26.

Figure 1:
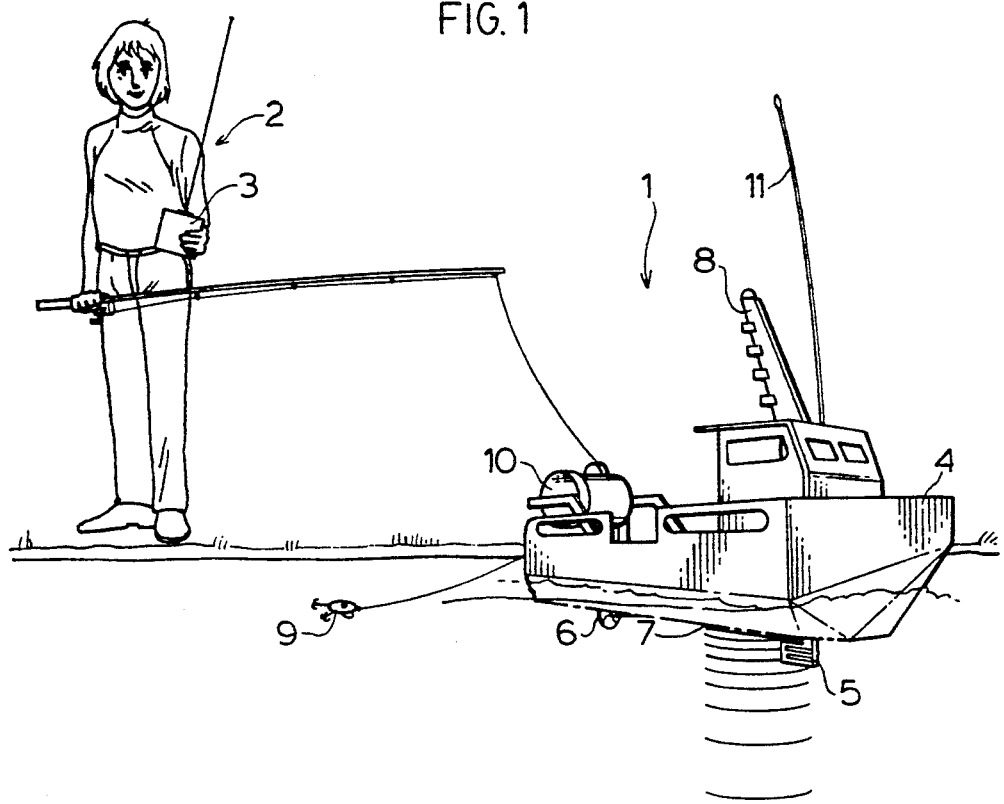
Figure 2:
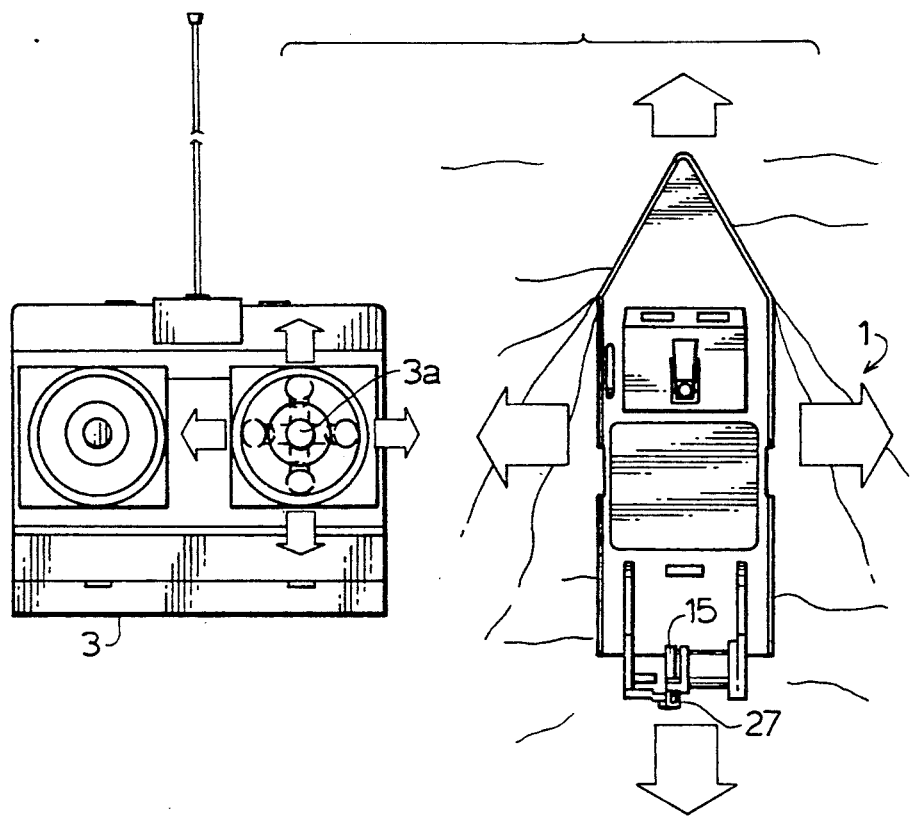
Figure 5:
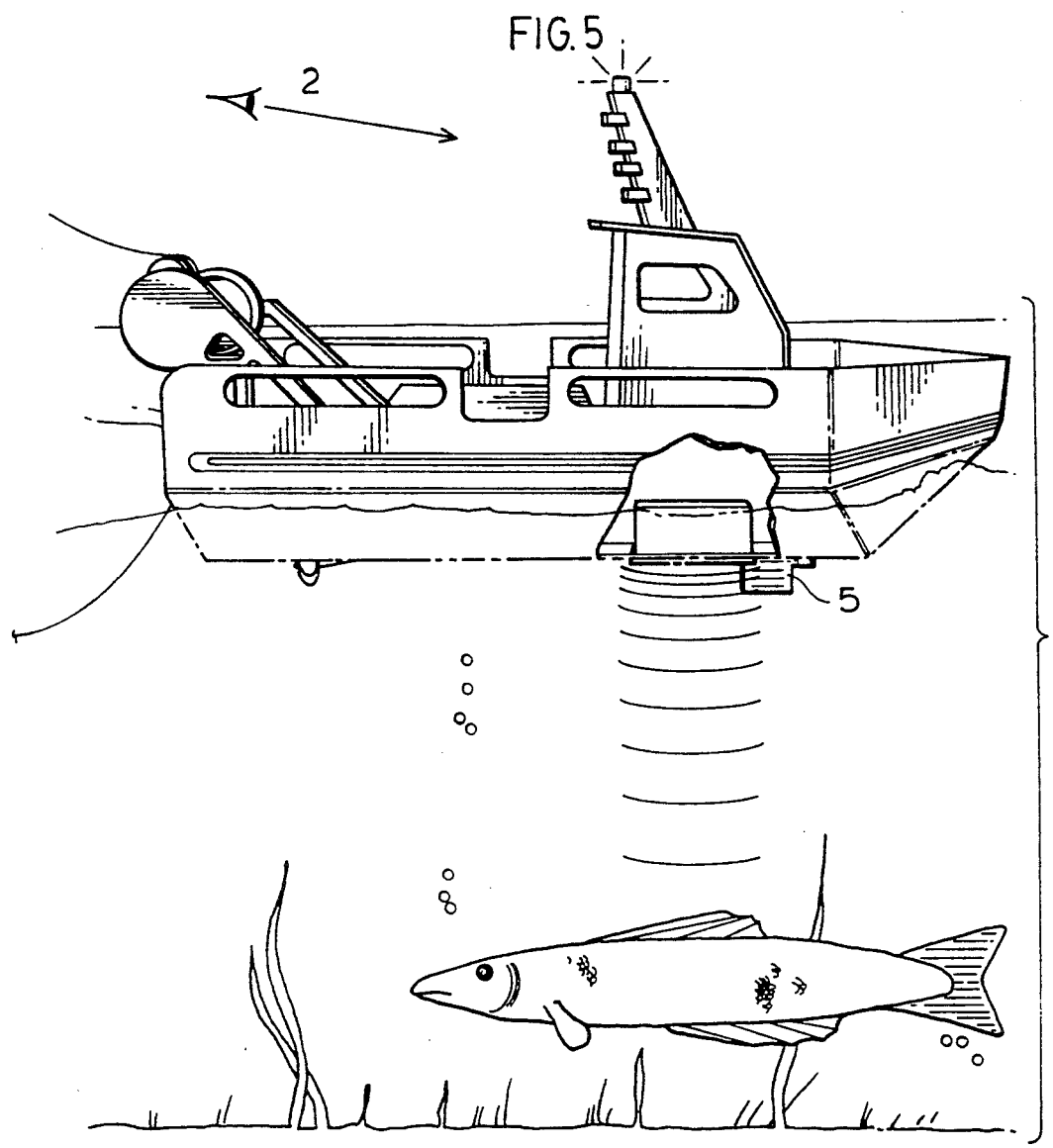
FIG. 5 is an elevated side view of the angling device in accordance with the present invention, illustrating the in situ operation of the device in monitoring a fishing habitat.

In operation, operator 2 employs remote radio control transmitter 3 to selectively control positioning of the terminal tackle 9 through a combination of the operation of depth control means 10 or selective positioning means including the control of rudder 5 and propeller 6. As shown in FIG. 2 of the drawings, selective positioning of joy stick 3a results in corresponding changes in the positioning of angling device 1. As is already well known in the radio remote control transmitter art, the harder operator 2 presses in any given direction, the faster angling device 1 is propelled in that corresponding direction. As illustrated in FIG. 3, operator 2 can manipulate joy stick lever 3b to selectively position terminal tackle 9 below and beneath angling device 1. Here again, the harder joy stick lever 3 is pressed in either direction, the more rapid the response rate of depth control means 10.

Transmitter 3 is operable to broadcast control signals which are received by antenna 11 and processed in a corresponding remote control radio receiver 27. As illustrated in FIG. 7, receiver 27 transmits appropriate control signals to propeller direction/speed controller 18, rudder servo 20, and, downrigger direction speed controller 21. Power supplied from a battery pack 17 is controllably delivered by controllers 18 and 21 to propeller motor 19 and downrigger motor 16, respectively. Propeller motor 19 is in turn mechanically connected to propeller 6. Similarly, friction wheel 15 is connected in driven relation to downrigger motor 16. Battery pack 17 also delivers power to rudder servo 20, which, responsive to control signals received from receiver 27, is operable to mechanically position rudder 5 and thereby control directional movement of angling device 1.

Battery pack 17 also powers the sonar device which comprises interpretive means 22 and transducer 7, as well as providing power for illuminating lights 23 and 24a through 24d, in response to intelligence interpreted by interpretive means 22 based on signals produced and received from transducer 7.

Battery pack 17 also provides power which is delivered through micro switch 25 on gate 28 to power line release light 26, once gate 28 has been opened far enough to release the fishing line from depth control means 10.

We claim:

1. An angling device operable under physically autonomous, remote control by a distant operator, comprising: a flotation platform including remotely operable propulsion and directional control means for selectively positioning said flotation platform under the remote, physically autonomous control of said operator, at a desired location on a surface of a body of water associated with fish habitat; and, downward-looking sonar means supported in buoyant relation on said platform, said sonar-sensing means being operably connected to interpretive means for converting sonar-sensed signals relating to said fish habitat into intelligence having angling relevance, said interpretive means being operatively connected to display means for conveying said intelligence to said distant operator in a visually perceptible format.

2. The angling device according to claim 1, wherein said display means comprises a standard extending aerially above said platform in view of said distant operator.

3. The angling device according to claim 2 wherein said platform is configured as a miniature boat hull and said standard is shaped to resemble a boat mast.

4. The angling device according to claim 1 wherein, said sonar-sensed signals relate to a selected one of the group consisting of:
    the depth of the water beneath the platform;
    the depth at which fish are located beneath the platform;
    the presence of fish beneath the platform; or, any combination of any of the above.

5. The angling device in accordance with claim 1 further including depth control means supported in buoyant relation on said platform, for selectively adjustable positioning terminal tackle at desired depths under physically autonomous radio remote control by said operator.

6. The angling device according to claim 5 wherein said propulsion, directional and depth control means are under radio remote control by said operator.

7. The angling device according to claim 6 wherein said control means comprises an at least two channel radio control transmitter operable on one said channel to control said position and on another said channel to raise and lower said terminal tackle.

8. The angling device according to claim 7 wherein said depth control means comprises a friction wheel connected in driven relation to an electric motor that is in turn connected to an electric power supply and is energizable from said supply under the selective, remote control of said operator, to rotate said friction wheel in contacting frictional driving engagement with a juxtaposed fishing line to thereby adjust the distance between said tackle at a free-terminus of said line and said platform, and to thereby adjustably position said terminal tackle beneath said surface.

9. The angling device according to claim 8 wherein the line is trapped in a channel defined on two mutually opposed sides by laterally spaced apart guides, and between a nip formed between said friction wheel and a free wheeling pulley that is spring biased into contacting relation with said wheel.

10. The angling device according to claim 9 wherein said guides and said pulley are hingedly mounted on said platform to rotate out of contacting relation with said friction wheel.

11. The angling device according to claim 10 wherein said guides and pulley are mounted to open outwardly and downwardly.

12. The angling device according to claim 8 wherein the friction wheel is operable at a predetermined angular velocity to feed said fishing line at a corresponding predetermined rate to thereby enable the operator to associatively determine the depth of the terminal tackle by the duration of the selective operation of said depth control means.

13. The angling device according to claim 12 wherein said terminal tackle is negatively buoyant.

14. The angling device according to claim 13 wherein the friction wheel feeds fishing line at a rate of about one foot per second.

15. An angling device operable under physically autonomous, remote control by a distant operator, comprising:
a flotation platform including remotely operable propulsion and directional control means for selectively positioning said flotation platform under remote, physically autonomous radio control of said operator at a desired location on a surface of a body of water associated with a fish habitat;
depth control means supported in buoyant relation on said platform, for selectively adjustably positioning terminal tackle at desired depths below said surface under remote, physically autonomous radio control by said distant operator; and,
radio control means comprising an at least two channel radio control transmitter operable on one said channel to control said positioning of said flotation platform and on another said channel to raise and lower said terminal tackle.

16. The angling device according to claim 15 wherein said depth control means comprises a friction wheel connected in driven relation to an electric motor that is in turn connected to an electric power supply and is energizable from said supply under the selective, remote control of said operator, to rotate said friction wheel in contacting frictional driving engagement with a juxtaposed fishing line to thereby adjust the distance between said tackle at a free-terminus of said line and said platform, and to thereby adjustably position said terminal tackle beneath said surface.

17. The angling device according to claim 16 wherein the friction wheel is operable at a predetermined angular velocity to feed said fishing line at a corresponding predetermined rate to thereby enable the operator to associatively determine the depth of the terminal tackle by the duration of the selective operation of said depth control means.

18. The angling device according to claim 17 wherein said tackle is negatively buoyant.

19. The angling device according to claim 18 wherein said friction wheel feeds fishing line at a rate of about one foot per second.

20. The angling device according to claim 16 wherein the line is trapped in a channel defined on two mutually opposed sides by laterally spaced apart guides, and between a nip formed between said friction wheel and a free wheeling pulley that is spring biased into contacting relation with said wheel.

21. The angling device according to claim 20 wherein said guides and said pulley are hingedly mounted on said platform to rotate out of contacting relation with said friction wheel.

22. The angling device according to claim 21 wherein said guide and said pulley are outwardly and downwardly hinged.

* * * * *